(12) United States Patent
Kondrus et al.

(10) Patent No.: US 12,418,162 B2
(45) Date of Patent: Sep. 16, 2025

(54) EXPLOSION-PROOF HOUSING COMPRISING REMOVABLE CENTRAL STRUT

(71) Applicant: R. STAHL SCHALTGERÄTE GMBH, Waldenburg (DE)

(72) Inventors: Elena Kondrus, Künzelsau (DE); Holger Semrau, Satteldorf (DE)

(73) Assignee: R. STAHL SCHALTGERÄTE GMBH, Waldenburg (DE)

( * ) Notice: Subject to any disclaimer, the term of this patent is extended or adjusted under 35 U.S.C. 154(b) by 167 days.

(21) Appl. No.: 18/267,623

(22) PCT Filed: Nov. 2, 2021

(86) PCT No.: PCT/EP2021/080383
§ 371 (c)(1),
(2) Date: Jun. 15, 2023

(87) PCT Pub. No.: WO2022/128231
PCT Pub. Date: Jun. 23, 2022

(65) Prior Publication Data
US 2024/0055838 A1 Feb. 15, 2024

(30) Foreign Application Priority Data

Dec. 15, 2020 (DE) .................... 10 2020 133 606.3

(51) Int. Cl.
*H02B 1/28* (2006.01)
*H02B 1/30* (2006.01)

(52) U.S. Cl.
CPC ................. *H02B 1/28* (2013.01); *H02B 1/30* (2013.01)

(58) Field of Classification Search
CPC .......... H02B 1/28; H02B 1/30; H02B 13/025; H01H 9/042; H02K 5/136; H05K 5/02;
(Continued)

(56) References Cited

U.S. PATENT DOCUMENTS

| 4,180,177 A | 12/1979 | Alcock et al. |
| 6,753,473 B2 | 6/2004 | Barlian et al. |

(Continued)

FOREIGN PATENT DOCUMENTS

| CN | 202712771 U | 1/2013 |
| CN | 205248634 U | 5/2016 |

(Continued)

OTHER PUBLICATIONS

International Search Report dated Jun. 23, 2022; International Application No. PCT/EP2021/080383; 3 pages (English).

(Continued)

*Primary Examiner* — Robert J Hoffberg
(74) *Attorney, Agent, or Firm* — CANTOR COLBURN LLP

(57) ABSTRACT

An explosion-proof housing including: a housing body which delimits an interior and comprises a housing opening that offers access to the interior; at least one central strut which extends between portions of the housing body and subdivides the housing opening into at least two opening portions, and at least two separate covers which are designed and arranged, in the closed state, to each be secured to the housing body and to the central strut in such a way that, between the covers and the housing body as well as between the covers and the central strut invariably flameproof joints are formed. The central strut is detachably mounted to the housing body and, in the mounted state, is loosely mounted on the housing body and movably supported such that the central strut is fixed directly to the housing body without the use of fixing means. The central strut can, as such, be removed individually from the housing body relatively easily and quickly in order to create a barrier-free housing opening of maximum size.

20 Claims, 9 Drawing Sheets

(58) Field of Classification Search
CPC ...... H05K 5/0214; H05K 5/0217; H05K 5/03; H05K 5/0004; H05K 7/16; H05K 7/18; H05K 5/04
See application file for complete search history.

(56) References Cited

U.S. PATENT DOCUMENTS

| | | | | |
|---|---|---|---|---|
| 6,877,827 | B2* | 4/2005 | Holighaus | H02B 1/30 312/213 |
| 6,945,616 | B2* | 9/2005 | Webster | H02B 1/50 312/265.3 |
| 7,109,414 | B2* | 9/2006 | Reynolds | H02G 3/086 174/53 |
| 9,943,003 | B2* | 4/2018 | Segroves | H05K 7/1488 |
| 10,148,149 | B2 | 12/2018 | Schwarz | |
| 10,537,038 | B2* | 1/2020 | Reese | H02B 1/38 |
| 10,947,773 | B2* | 3/2021 | Reese | H02B 1/38 |
| 12,053,657 | B2* | 8/2024 | Kondrus | A47B 81/00 |
| 12,171,069 | B2* | 12/2024 | Kondrus | H02B 1/28 |
| 2014/0001932 | A1* | 1/2014 | Westby | H02B 3/00 312/223.1 |
| 2015/0326091 | A1 | 11/2015 | Schwarz | |
| 2022/0201872 | A1 | 6/2022 | Kondrus et al. | |

FOREIGN PATENT DOCUMENTS

| | | |
|---|---|---|
| CN | 208874129 U | 5/2019 |
| DE | 102019102832 A1 | 8/2020 |
| DE | 102020133606 B3 | 12/2021 |
| EP | 1107656 A2 | 6/2001 |
| RU | 133371 U1 | 10/2013 |
| RU | 2619269 C2 | 5/2017 |
| SU | 543399 A1 | 1/1977 |
| WO | 2020160937 A1 | 8/2020 |

OTHER PUBLICATIONS

International Search Report dated Jun. 23, 2022; International Application No. PCT/EP2021/080383; 5 pages (non-English).
Written Opinion dated Jun. 23, 2022; International Application No. PCT/EP2021/080383; 7 pages (non-English).
Written Opinion dated Jun. 23, 2022; International Application No. PCT/EP2021/080383; 6 pages (English).
Russian Search Report for International Application No. PCT/EP2021/080383; Issue Date, Jan. 30, 2025, 3 pages.

* cited by examiner

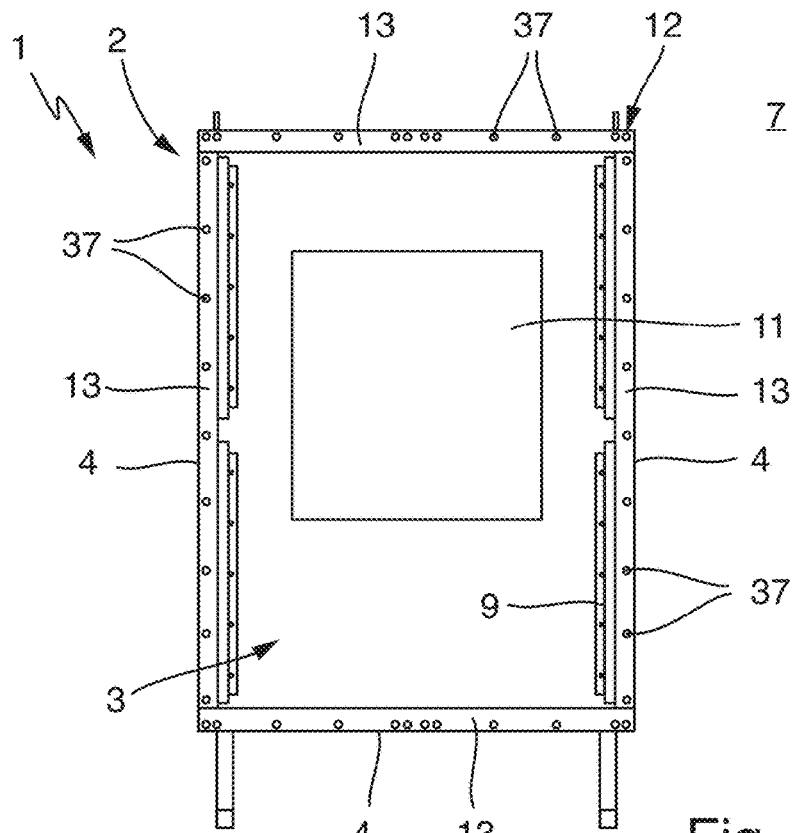
Fig. 3
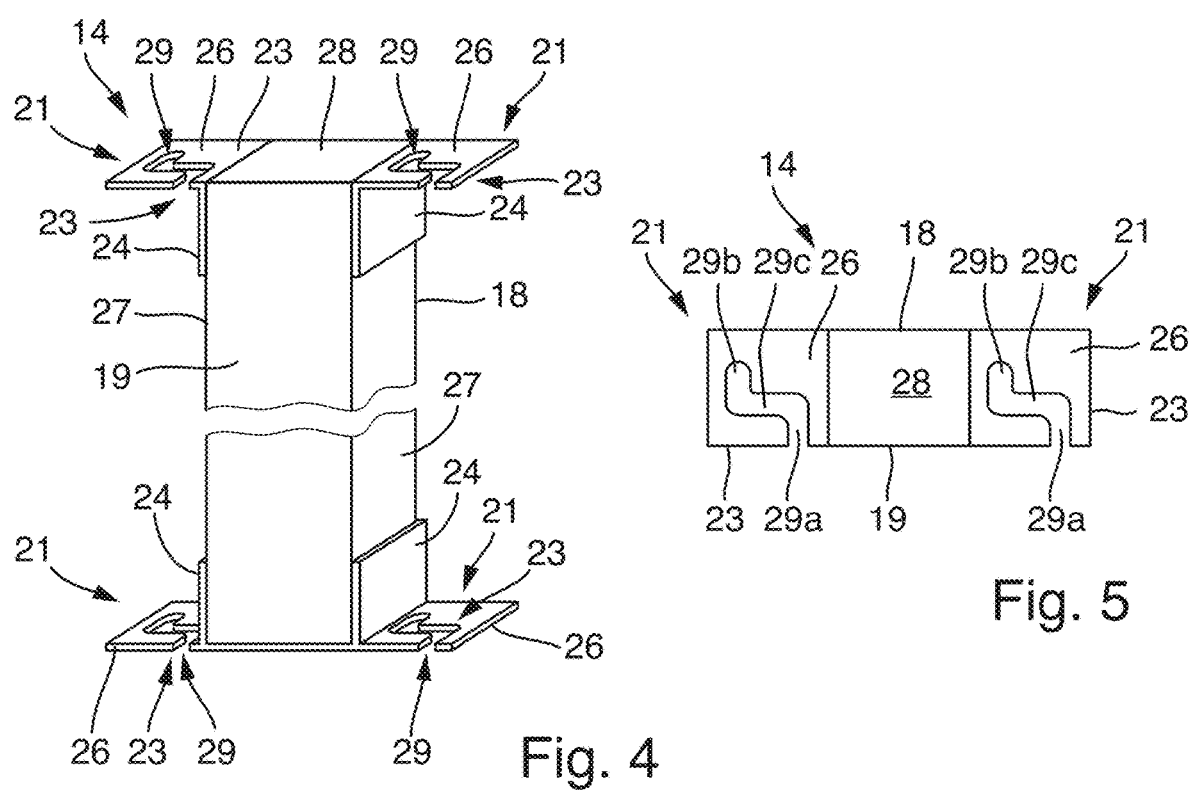
Fig. 4
Fig. 5

EXPLOSION-PROOF HOUSING COMPRISING REMOVABLE CENTRAL STRUT

CROSS REFERENCE TO RELATED APPLICATIONS

This application is a National Stage of PCT Application No. PCT/EP2021/080383 filed on Nov. 2, 2021, which claims priority to German Patent Application No. 10 2020 133 606.3 filed on Dec. 15, 2020, the contents each of which are incorporated herein by reference thereto.

BACKGROUND

The invention relates to an explosion-proof housing in which openings and gaps present between the interior of the housing and the environment are so narrow and so long that flames, sparks or glowing particles cannot escape from the housing into the environment. These housings comply with the flameproof enclosure type of protection (Ex d), for example in accordance with one of the standards EN 60079-1 or IEC 60079-1.

Explosion-proof housings are used in potentially explosive atmospheres to accommodate possible ignition sources that can ignite a potentially explosive atmosphere in a protected manner in an interior space of the explosion-proof housing. For example, an electrical and/or electronic device can serve as an ignition source. Such a device can also be operated safely in a hazardous area in the interior of the explosion-proof housing.

Such explosion-proof housings are known per se. For example, EP 1 107 656 A2 describes an explosion-proof housing in the flameproof enclosure type of protection (Ex d). The housing has a housing body with a housing opening. A lid of the explosion-proof housing can be placed on a contact surface surrounding the housing opening. By means of a clamp, a clamped connection can be made between the lid and the housing body.

Furthermore, an explosion-proof housing is known from U.S. Pat. No. 4,180,177 A, which has a housing opening that can be closed by means of a hinged lid. When the lid is closed, it is secured to the housing body by means of screws in order to seal the interior of the explosion-proof housing from the environment in a manner that prevents ignition penetration.

Such explosion-proof housings have proven themselves in practice. As a rule, the connection of housing parts of pressure-resistant housing to one another takes place via a flat gap. In this way, a flameproof housing can be closed by means of a lid that is continuously connected to the housing all the way around via a flat gap. Long and narrow flat gaps can ensure that no ignition sparks, flames, hot, ignitable gases or the like can escape from the interior of the housing and lead to ignition of the surrounding potentially explosive atmosphere.

The housing opening is generally relatively large to allow the placement of electronic and/or electrical devices in the interior through the housing opening. This in turn means that a lid closing the housing opening, which must withstand the explosion pressure in the interior of the housing, can be large and heavy. This makes handling of the lid difficult when mounting the electrical and/or electronic device or other built-in components in the housing. For example, hinged lids require complex hinges that must hold the large and heavy lid and provide sufficient swivel range to ensure access to the housing interior through the housing opening when the lid is in the open position. The weight and handling of the lid may be further complicated, depending on the design of the housing, if there are fixtures and/or operating elements in the lid for operating the electrical and/or electronic devices, such as indicators, switches, buttons, touch-sensitive surfaces or monitors, or the like.

To avoid or reduce these problems, flameproof housings have been developed that have two or more adjacent lids that can be opened to provide access to the interior of the explosion-proof housing. The housing must have an appropriate integral strut in the area of the access opening to allow the lids to be placed thereagainst and secured thereto forming a flameproof gap.

For example, CN 202712771 U describes an explosion-proof housing having a housing body which defines a housing opening divided into two opening sections by a middle strut of the housing body and enclosed by a flange of the housing body. Two lids can be attached to the middle strut and the flange to close the housing opening in a flameproof manner.

Flameproof housings with several separate lids and at least one integral strut on the housing are relatively difficult to manufacture, assemble and use. In conventional constructions, the integral strut is fixed by being welded, for example, to the housing frame or housing flange surrounding the housing opening so that its gap surface is in the same plane as the plane of the surrounding housing gap surface surrounding the housing opening. The circumferential housing gap surface and the strut gap surface must be finished together after joining by milling, grinding, or other suitable machining methods to a flatness suitable for the desired gap dimension. This may require several machining operations and can thus be costly and tedious in any case. The strut, which is fixed to the housing, also obstructs free access to the housing and restricts the overall access opening.

To overcome these disadvantages, DE 10 2019 102 832 proposes to provide a frame part which is detachably secured to the housing body and which has a circumferential web surrounding the housing opening and a middle web extending inside the circumferential web and dividing the housing opening into at least two opening sections. At least two separate lids are provided which, in a closed position, rest against the circumferential web and the middle web, respectively, so that a flameproof gap is formed between the lid and the frame part. When assembling the housing, the frame part can be omitted or removed from the housing for the time being to create a large access opening to the interior of the housing through which large electrical and electronic devices can also be introduced into the interior of the housing. Only then are the frame part and lids attached to the housing body to close the housing and form the flameproof gaps.

However, the frame part must be relatively stable. In particular, the integral middle web of the frame part must be relatively solid and thick if the lids are to be placed against the middle web and secured thereto in a flameproof manner, for example using screw bolts. Such a frame part can be of considerable weight, difficult to manufacture, and difficult to handle because of its size and weight.

BRIEF SUMMARY

Starting herefrom, it is an object of the invention to provide an explosion-proof housing which has a simple structure, is relatively easy to assemble, and facilitates installation of electrical and/or electronic devices and other large fixtures in the interior of the explosion-proof housing.

Disclosed is an explosion-proof housing, including: a housing body defining an interior space and having a housing opening providing access to the interior space, the housing body having a circumferential housing gap surface surrounding the housing opening; at least one middle strut which can be detachably mounted on the housing body so that the at least one middle strut can be removed from the housing body, while in a mounted state to the housing body, the at least one middle strut extends between sections of the circumferential housing gap surface and divides the housing opening into at least two opening sections, the at least one middle strut being loosely supported on the housing body in the mounted state, the at least one middle strut having at least one middle strut gap surface; and at least two separate lids which are configured and arranged to be secured in each case in a closed state to the housing body and the at least one middle strut in such a way that flameproof gaps are formed between the at least two separate lids and the housing body at the circumferential housing gap surface and between the at least two separate lids and the at least one middle strut at the at least one middle strut gap surface.

The explosion-proof housing according to the invention is in particular a housing of the "flameproof enclosure" type of protection (Ex d) and comprises a housing body, at least one middle strut and at least two separate lids. The housing body defines an interior space and has a housing opening providing access to the interior space and a circumferential housing gap surface surrounding the housing opening. The at least one middle strut is detachably mountable to the housing body so as to be individually removable as such from the housing body, while, in the mounted state, it extends between sections of the circumferential housing gap surface and divides the housing opening into at least two opening sections. In the mounted state, the at least one middle strut is loosely supported on the housing body without being directly fixed to the housing body. The middle strut has at least one middle strut gap surface. The at least two separate lids are configured and arranged to be secured in each case in the closed state to the housing body and the middle strut in such a way that flameproof gaps are formed between the lids and the housing body at the circumferential housing gap surface and between the lids and the middle strut at the at least one middle strut gap surface.

The invention is based on the idea of detachably mounting the strut in such a way that it can be quickly and easily removed from the housing for assembly work. This greatly facilitates the installation of large electrical and electronic devices or other fixtures in the interior space of the housing. In addition, it is ensured according to the invention that the gap plane of the at least one middle strut does not have to be brought to the same plane of the circumferential housing gap surface by time-consuming adjustment. All this is made possible by the advantageous loose support of the at least one middle strut.

The explosion-proof housing may be a box-like housing defining an interior space contoured, for example, as a cuboid, or it may also have a cylindrical or polygonal or other suitable cross-sectional contour. A plurality of housing walls of the explosion-proof housing may be connected to each other by screwing, bonding, welding or other type of connection that will withstand any explosion pressure in the interior of the housing and will not allow flames, sparks or ignitable gases to escape to the exterior from the interior space. The interior space can be used to mount electrical or electronic devices or other fixtures that may spark or create a source of ignition during operation.

A plurality of such middle struts and a plurality of lids, in particular a number of lids corresponding to the number of opening sections formed, may be provided. The lids do not necessarily have to be adjacent to each other, but can also be arranged one above the other or in other relative positioning to each other.

It is advantageous if the circumferential housing gap surface defines a first of the flameproof gaps and the at least one middle strut gap surface defines a second of the flameproof gaps, and the first and second flameproof gaps are flat gaps lying in a common plane. This allows for ease of design and manufacture of the housing and safe, effective explosion protection.

Advantageously, the at least one middle strut may be arranged to also be movably retained when loosely mounted to the housing body. No fixing means are provided for directly securing the at least one middle strut to the housing body, both when the lids are in the closed state and when they are in the open state. Such loose retaining and movable support of the middle strut facilitates handling, especially assembly and disassembly, and provides the basis for not requiring extensive adjustment or machining of the middle strut to bring the at least one middle strut gap surface into the same plane as the circumferential housing gap surface.

The middle strut according to the invention is also not an integral part of an intermediate frame that is attached to the housing body to provide a middle web for securing the lids. Rather, the middle strut is an elongated beam or girder that may be solid, preferably rectangular or square in cross-section, or may be a rectangular tube, square tube, or profile, such as a C-profile.

A bearing device may be provided, which may include a first bearing member on the middle strut and a second bearing member cooperating therewith on the housing body. The first bearing member and the second bearing member cooperate such that the middle strut is loosely supported and movably retained on the housing body and can be quickly and easily released from the housing body at any time without having to release any fixed connection between the middle strut and the housing body.

In advantageous embodiments, one of the first and second bearing members may comprise a tab provided on one of the at least one middle strut and the housing body and formed with an elongated hole, while the other of the first and second bearing members comprises an engagement member, preferably a bolt, slidably received in the elongated hole upon assembly of the at least one middle strut to the housing body. For example, the tab with the elongated hole may be provided on the middle strut and the engagement member may be provided on the housing body, or vice versa.

In particularly preferred embodiments, the at least one middle strut has two substantially L-shaped tabs at each of its longitudinal ends, which may also be referred to as L-brackets or L-profiles, one leg of which is attached to a respective side surface of the at least one middle strut and the other leg of which has the elongated hole. Pins may be formed on the housing body to form the engagement means, each of which cooperates with an associated elongated hole to loosely support and movably retain the at least one middle strut. Such tabs with elongated holes are provided on both sides of the middle strut, on both sides of the middle strut gap surface, the tabs being able to be loosely fitted onto pins on the housing body. The assembly is carried out using simple means, quickly and with little effort.

In one embodiment, the elongated hole may include a single elongated hole section having an open end and extending in a direction perpendicular to the middle strut gap surface. The elongated hole section is designed to be sufficiently wide and long to allow for relative displacement between the elongated hole and the associated pin with clearance. The assembly is particularly simple because the middle strut can merely be fitted with its elongated holes onto the associated pins, and a single movement of the middle strut perpendicular to the housing opening can transfer the middle strut to a position in which the lids can be closed and secured to the middle strut. However, the middle strut is in no way secured to the housing body and, as long as the lids are not closed and secured, could inadvertently detach itself from the housing body if, for example, it is bumped by a careless person.

Therefore, in preferred embodiments, each elongated hole has two or more elongated hole sections that are interconnected to form a bend and that are each configured to be sufficiently wide and long to allow for relative displacement between the elongated hole and the associated pin or other engagement means. For example, one elongated hole section having an open end may serve to attach the middle strut on the associated bolt, while at least one other elongated hole section receives the pin in the end position in which the lids may be closed and secured. The at least one bend between the elongated hole sections prevents the loosely mounted middle strut from inadvertently detaching from the housing body relatively easily.

In a particularly preferred embodiment, each elongated hole in each of the L-shaped tabs of the middle strut has a first elongated hole section oriented perpendicular to the middle strut gap surface and has an open end to permit attaching the elongated hole to the associated pin, a second elongated hole section parallel to and offset from the first elongated hole section and having a length that allows limited movement of the middle strut perpendicular to the housing opening in the end position, and a third elongated hole section connecting the first elongated hole section to the second elongated hole section. This embodiment provides both ease of assembly and disassembly and a high degree of security when the middle strut is loosely supported on the housing body.

A tensioning mechanism including tensioning means may be provided, the tensioning mechanism being arranged to tighten and hold on the lids to the housing body and the at least one middle strut and to maintain the flameproof gaps. Preferably, screw means may be used as the tensioning means, in which case internal threads may be formed in the housing body and the middle strut into which screw bolts inserted through the lids may be screwed. The internal threads could also be formed in an internally threaded sleeve attached to the housing body and/or the middle strut, for example by welding, bonding or otherwise. Tightening the tensioning means creates and maintains the flameproof gaps on both the circumferential housing gap surface and the at least one middle strut gap surface. Hinges or other joints that pivotally support the lids on the housing body, for example, may have relatively large clearances that are eliminated when the lids are tensioned by the tensioning means.

In addition to screws, other tensioning means, such as tension clamps, quick-release fasteners or other locking mechanisms or fastening means, tensioning or retaining means can also be used to hold the lids in firm contact with the housing body. Even in the event of an impulse-like increase in pressure within the housing, it can be ensured that the gap width of the flameproof gaps does not exceed a few hundredths of a millimeter, or in any case does not reach a gap dimension that would permit an ignition transmission.

The tensioning means for securing the lids to the housing body and the middle strut do not provide direct firm fixation of the middle strut to the housing body. The flameproof housing is free of such tensioning, clamping or other fixing means that would provide direct fixation of the middle strut to the housing body. No such fixing means are provided.

Advantageously, the at least one middle strut may be loosely supported on the housing body such that when the lids are tightened to the at least one middle strut by means of the tensioning mechanism, when the lids are placed against the middle strut and secured, the middle strut may be pulled toward the lids and moved to bring the middle strut gap surface into contact with a mating contact surface on the lids or an intermediate frame interposed between the middle strut and the lids and into the same plane with the circumferential housing gap surface. For example, in embodiments using the L-shaped tabs with elongated holes, the elongated holes in the elongated hole section effective in the end position of the middle strut may be configured with such a length and width that the middle strut is displaced along the elongated hole section toward the lid solely by tightening the tensioning means, e.g., screw bolts, until the middle strut comes into contact with the gap surface of the lid or an intermediate frame and the flameproof gap is formed therebetween. The middle strut is thus configured for self-adjustment by automatically positioning itself to fit when the lid is fixed to the middle strut. This eliminates the need for time-consuming adjustment procedures and machining on the middle strut.

In a further embodiment of the invention, the explosion-proof housing may further comprise an intermediate frame made of a thin, slightly elastic sheet metal, which is detachably secured to the housing body and which comprises a circumferential web surrounding the housing opening and resting against the housing gap surface to form the first flameproof gap, and at least one middle web extending within the circumferential web and overlying the at least one middle strut and resting against the at least one middle strut gap surface forming the second flameproof gap, wherein a flameproof gap is formed between each lid and the intermediate frame. Such an intermediate frame may be fabricated in one piece, integrally formed with the circumferential web and the middle web, from a thin sheet of metal, wherein no particularly high machining precision is required for the intermediate frame. Rather, advantageously, the flexibility of the relatively thin standard sheet metal can be utilized to provide tight closing of the gaps on both sides of the intermediate frame, allowing a high degree of machining freedom. When the thin intermediate frame is interposed between the lids and the housing body and the middle strut, optimum predetermined flameproof flat gaps are obtained in defined planes and with defined gap dimensions after the lids have been closed and fixed in place, without any complex adjustment being required for this purpose.

The thin intermediate frame may have a thickness of less than 10 mm, preferably less than 5 mm, in preferred embodiments a thickness of about 3-4 mm. This results in a low material requirement and a low weight of the intermediate frame, which also simplifies handling. The thickness is measured perpendicular to the gap surfaces of the intermediate frame. The thin intermediate frame sheet can fit closely with its gap surfaces against the gap surfaces of the lids, the housing body and the middle strut and can form the desired flameproof gaps.

Such a thin intermediate frame can be used particularly advantageously in conjunction with the loosely mounted middle strut. It would be less useful or safe on fixed middle struts because deformation could easily occur at the transition between the thin intermediate frame sheet and the solid middle strut, which could negatively affect the gap dimension. This is avoided by separating the thin intermediate frame sheet with the thin middle web and the middle strut and by loosely supporting the middle strut. When the lids and the intermediate frame are tightened to the housing body and the middle strut, the middle strut will gently and evenly press against the thin intermediate frame so that no deformation of the intermediate frame occurs and a minimal gap of uniform dimension is created along the entire middle strut gap region.

In the embodiment including the thin intermediate frame, a tensioning mechanism may be provided which is arranged to tighten and hold the intermediate frame in contact with the housing body and the at least one middle strut and to maintain the flameproof gap therebetween and to tighten and hold the lids in contact with the circumferential web and the at least one middle web of the intermediate frame sheet and to maintain the flameproof gap therebetween. At least some, preferably most or even all of the tensioning means of the tensioning mechanism can thereby fix both the intermediate frame and the respective lid.

BRIEF DESCRIPTION OF THE DRAWINGS

Further advantageous embodiments of the invention are apparent from the dependent claims, the description and the drawings. In the following, preferred embodiments of the invention are explained in detail with reference to the accompanying drawings. In the drawings:

FIG. 3 is a front view of the explosion-proof housing of FIG. 1 in the open state and with the middle strut removed, in a simplified representation;

FIG. 4 is a perspective view of a loosely supported middle strut inserted into the explosion-proof housing;

FIG. 5 is a top view of the middle strut shown in FIG. 4 with tabs attached to it;

DETAILED DESCRIPTION

Figure 1:
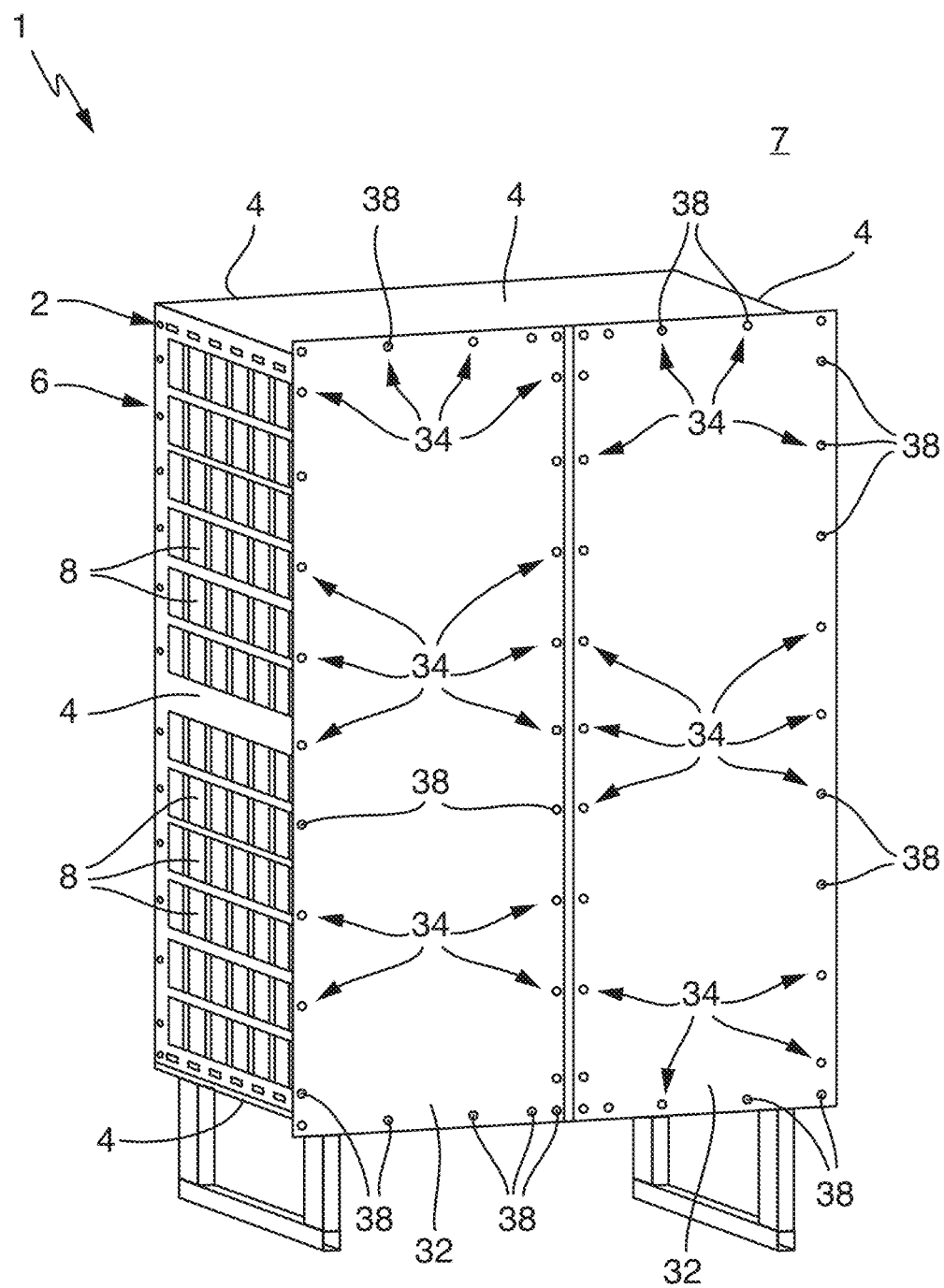
FIG. 1 is a perspective view of an embodiment of an explosion-proof housing in a closed state.
Figure 2:
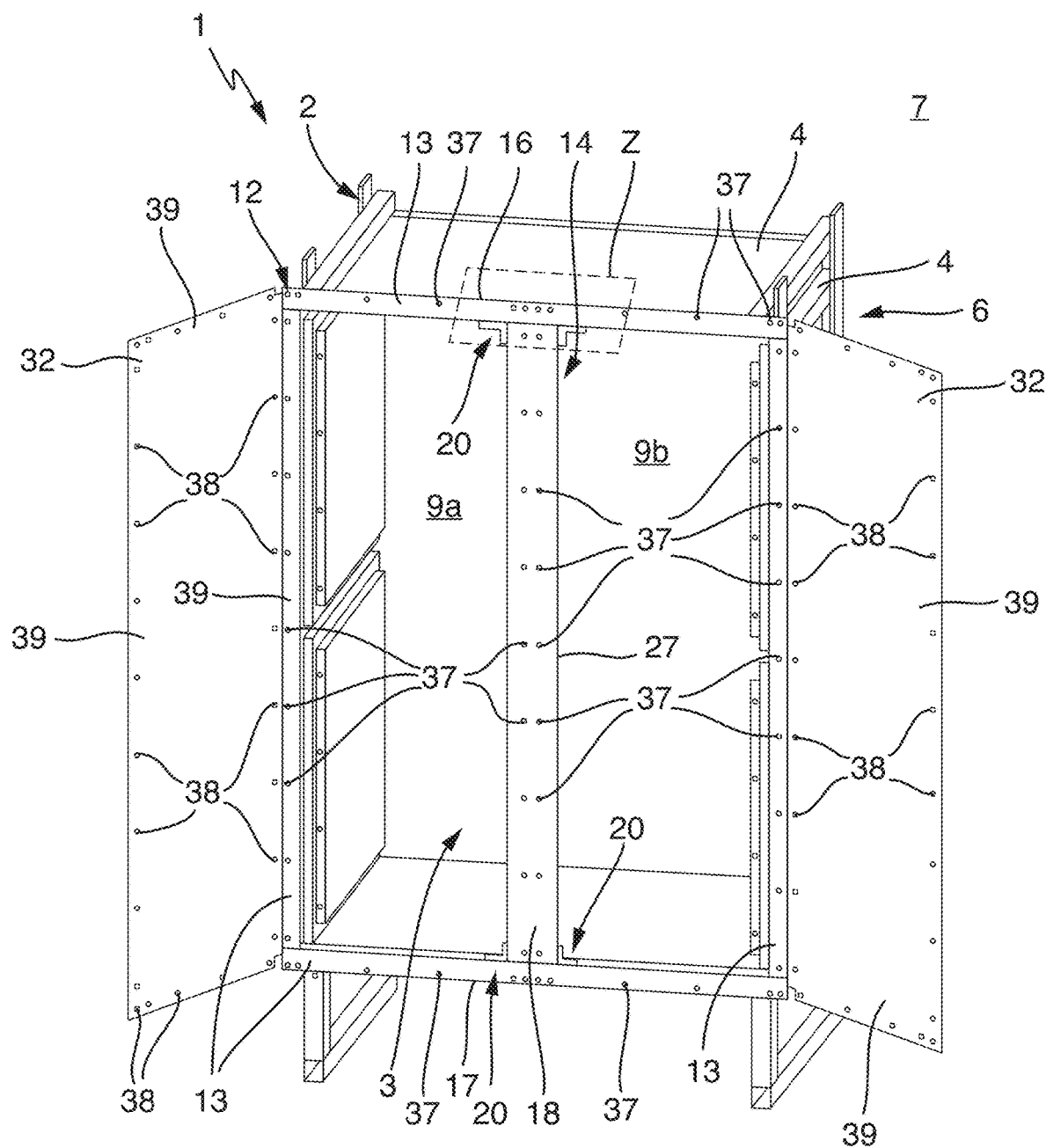
FIG. 2 is a perspective view of the explosion-proof housing according to FIG. 1 in an open state.

FIGS. 1 and 2 each illustrate a perspective view of an exemplary embodiment of an explosion-proof housing 1. The explosion-proof housing 1 comprises a housing body 2 which delimits an interior space 3. For this purpose, the housing body 2 comprises a plurality of housing walls 4 which are connected to one another. The housing walls 4 may be connected to each other, for example, by a screw connection, a bonded connection, a welded connection, a combination of these types of connection or another suitable type of connection that withstands any explosion pressure in the interior space 3 and does not allow flames, sparks or hot ignitable gases or the like to escape from the interior space 3. For example, the housing body 2 may be substantially box-shaped and have five housing walls 4 defining a cuboid contoured interior space 3.

In a variation on the embodiment shown, the housing body 2 can also be hollow cylindrical or have a polygonal cross-sectional contour. The shape of the housing body 2 is in principle freely selectable.

A pressure relief device 6 can be arranged in one or more housing walls 4 to provide a gas flow channel between the interior space 3 and an environment 7 outside the explosion-proof housing 1. The at least one gas flow channel of the pressure relief device 6 is designed in such a way that no ignitable gases, sparks or flames from the interior space 3 can reach the environment 7. Due to the pressure relief device 6, the maximum explosion pressure occurring within the interior space 3 is reduced in the event of an explosion, so that a correspondingly lower strength of the explosion-proof housing 1 is sufficient to withstand the maximum possible explosion pressure in the interior space 3. As a result, the explosion-proof housing 1 can be made simpler and less heavy.

In the embodiment shown, the pressure relief device 6 may have porous bodies 8 which are integrated into the side walls of the housing body 2 and which have a sufficient volume so that hot gas flows entering the porous bodies 8 are cooled to such an extent that their volume reduction prevents the build-up of overpressure peaks in the interior space 3. Furthermore, an additional pressure relief effect can be achieved by means of the porous bodies 8 through gas transfer to the outside.

The housing body 2 has a housing opening 9. Through the housing opening 9, the interior space 3 is accessible, for example, in order to arrange at least one electrical and/or electronic device 11, as shown in FIG. 3, which could serve as a source of ignition for a potentially explosive atmosphere in the environment 7, in the interior space 3 of the housing body 2 or of the explosion-proof housing 1.

In the embodiment described herein, the housing opening 9 of the housing body 2 is enclosed by a housing flange 12 that is completely closed in the circumferential direction around the housing opening 9. A housing contact surface or housing gap surface 13 is provided on the housing flange 12, which faces away from the housing body 2. Preferably, the entire housing contact surface 13 extends in a single plane. In a modified embodiment, the housing contact surface 13 may also be formed by the end surfaces of the housing walls 4 that enclose the housing opening 9. Depending on the thickness or strength of the housing walls 4, the housing flange 12 can therefore optionally also be omitted if the wall thickness of the housing walls 4 is sufficiently large.

The explosion-proof housing 1 further includes a middle strut 14 that is detachably mountable to the housing body 2 so that it can be removed from the housing body 2 as needed to allow for unobstructed access to the interior space 3 of the housing 1 with maximum free housing opening 9. FIG. 3 shows the explosion-proof housing 1 in an open state, with the middle strut 14 removed from the housing 1. In the mounted state, the middle strut 14 extends between two sections of the housing body 2 in such a way that it divides the housing opening 9 into two opening sections. In the example shown in FIGS. 1 and 2, the middle strut extends between an upper horizontal flange section 16 and a lower horizontal flange section 17 of the housing flange 12 preferably, but not necessarily, approximately in the middle of the horizontal extent of the housing body 2, and it divides the housing opening 9 into two adjacent rectangular opening sections 9a and 9b of substantially equal size.

As is also apparent from the simplified perspective view shown in FIG. 4, the middle strut 14 is preferably a solid beam or girder, having here, for example, a square or rectangular cross-section. Further, the middle strut has, on one side, a middle strut contact surface 18 which extends in a single plane and is precisely machined to form a gap surface 18 to define a flameproof gap. The middle strut contact surface 18 is visible in FIG. 2, while FIG. 4 shows the middle strut 4 looking at its rear side 19, which faces the interior space 3 of the housing 1 in the mounted state and extends here parallel to the middle strut contact surface 18.

The length of the middle strut 14 corresponds to the clear height of the interior space 3, which corresponds to the distance between the upper and lower housing walls 4 or between the upper flange section 16 and the lower flange section 17. The middle strut 14 is preferably machined to fit between the housing walls 4 or flange sections 16, 17 with very little clearance.

To enable quick and easy assembly and disassembly of the middle strut 14 to or from the housing body 2 and to enable its self-adjustment, the middle strut 14 is loosely supported on the housing body 2. That is, the middle strut 14 is not directly fixed firmly to the housing body 2. Rather, a bearing device 20 is provided for loosely supporting and movably retaining the middle strut 14 on the housing body 2. The bearing device 20 comprises first bearing members 21 which are fixed to the middle strut 14 and second bearing members 22 on the housing body 2 which interact with the first bearing members 21.

In the illustrated embodiment, the first bearing members 21 are each formed by a substantially L-shaped tab, which may also be referred to as an L-angle or L-profile, having a first leg 24 and an integral second leg 26 that form a substantially perpendicular angle with each other. The first legs 24 of the tabs 23 are attached, for example welded, bonded, bolted, or otherwise fixedly secured to side surfaces 27 of the middle strut 14 near respective ends of the middle strut 14 so that the second legs 26 project away from the side surfaces 27 in opposite directions at the respective ends of the middle strut 14 and terminate at substantially the same height as the upper or lower end surface 28 of the middle strut 14.

As can also be seen from the top view of the middle strut 14 with the tabs 23 in FIG. 5, an elongated hole 29 is provided in each of the second legs 26. Here, the elongated hole 29 has an elongated and multi-curved shape with several interconnected elongated hole sections 29a-29c. A first elongated hole section 29a has an end open towards the rear side 19 of the middle strut 14 in the mounted state, in order to enable the elongated hole 29 to be plugged onto an associated second bearing member 22 of the bearing device 20 on the housing body 2. A second elongated hole section 29b extends completely within the second leg 26 and is parallel to and offset from the first elongated hole section 29a, the second elongated hole section 29b, like the first elongated hole section 29a, being oriented perpendicular to the middle strut contact surface 18 in the mounted state. A third elongated hole section 29c connects the first elongated hole section 29a to the second elongated hole section 29b, forming a substantially 90° bend between the first elongated hole section 29a and the connecting section 29c and between the connecting section 29c and the second elongated hole section 29b.

The elongated holes 29 in all of the tabs 23 all have the same course, so that, in the mounted state, the elongated holes 29 of the tabs 23 at one longitudinal end of the middle strut 14 extend offset from one another in the horizontal direction by a defined distance, and the elongated holes 29 of the tabs 23 at the opposite ends of the middle strut 14 on one side surface 27 extend in alignment with one another in the longitudinal direction of the middle strut 14.

The second bearing members 22 of the bearing device 20 are formed by engagement members provided on the housing body 2, which are configured to be slidably received in the respective elongated hole 29 of the associated tab 23 when the middle strut 14 is mounted on the housing body 2. In the illustrated exemplary embodiment, the second bearing members 22 are formed by substantially cylindrical pins 31 whose diameter is slightly smaller than the width of the elongated hole 29, so that the pins 31 fit with clearance into the respective elongated hole 29 and a relative displacement of the pin 31 with respect to the elongated hole 29 is easily possible.

Figure 6:
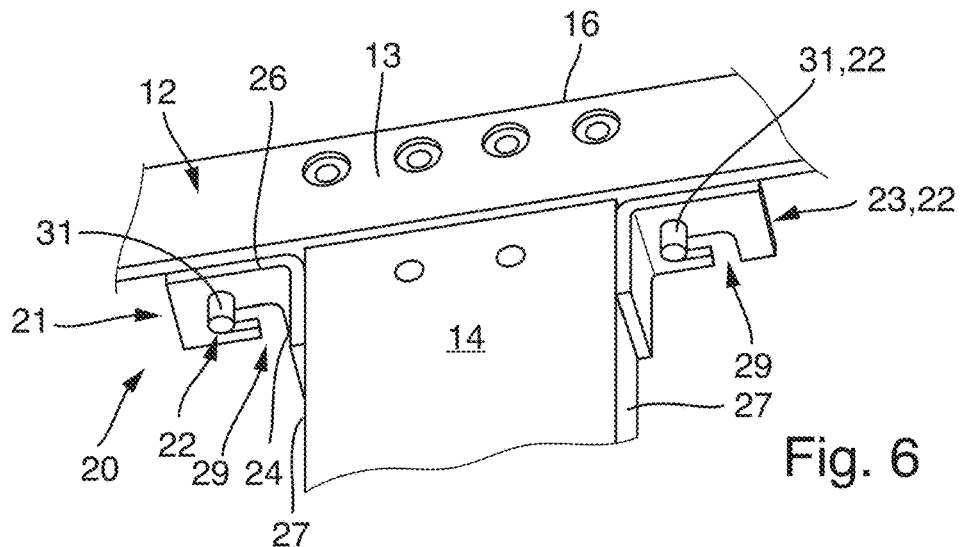
FIG. 6 is the section Z of FIG. 2 illustrating the interface between a housing body and the middle strut of the explosion-proof housing, in an enlarged perspective view.

FIG. 6 shows the middle strut 14 in a state mounted on the housing body 2, in which the pins 31 are received in the tabs 23 at the closed ends of the elongated holes 29, but are displaceable relative to the elongated hole 29. In this manner, the middle strut 14 is loosely supported and movably retained on the housing body 2.

It is understood that the pins 31 need not necessarily be circular cylindrical in shape, but may be of any suitable shape suitable for allowing the associated tab 23 with elongated hole 29 to be fitted onto and moved relative to the pin or another engagement member. The distance between the pins 31 on the upper or lower housing wall 4 in the horizontal direction corresponds to the horizontal distance between the elongated holes 29 at each longitudinal end of the middle strut 14.

Figure 7A:
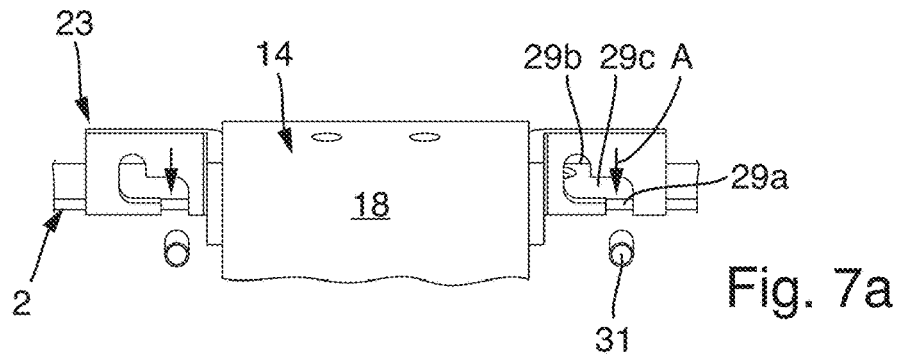
FIGS. 7a-7c are mounting views illustrating the mounting of the middle strut to the housing body in simplified perspective views similar to FIG. 6.
Figure 7B:
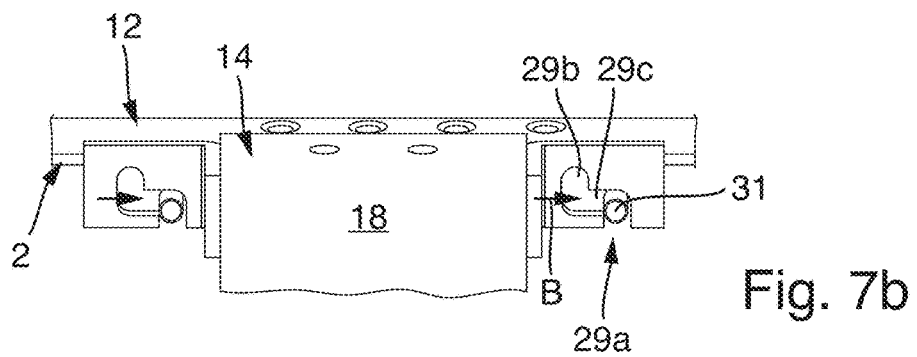
Figure 7C:
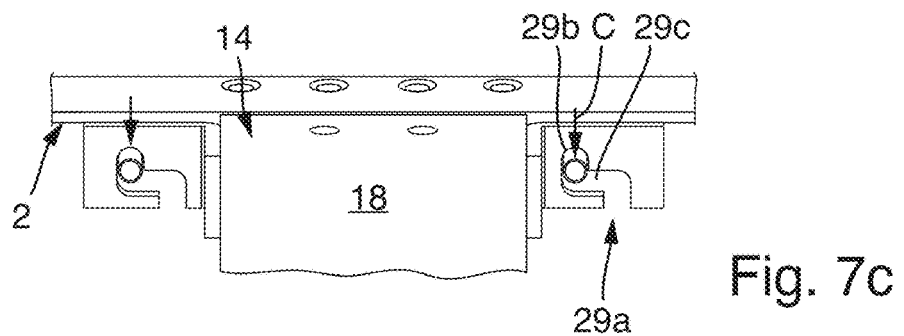

FIGS. 7a-7c show perspective views of the interface between the middle strut 14 and the associated upper or lower housing wall 4 of the housing body 2 to illustrate the process of mounting the middle strut 14 on the housing body section. Although only an interface between, for example, the upper section of the housing body 2 and the upper longitudinal end of the middle strut 14 is illustrated herein, it is understood that the explanations herein equally apply to the lower section of the housing body 2 and the lower longitudinal end of the middle strut 14. In particular, the assembly of the middle strut 14 is performed simultaneously on both the upper and lower sections of the housing body 2. The assembly procedure is also the same for a middle strut 14 to be arranged horizontally or to be attached to the housing body 2 in some other orientation.

To assemble the middle strut 14, it is brought up to the housing body 2 from the outside and positioned such that the open ends of the first elongated hole section 29a are substantially opposite the pins 31 on the housing body 2 while the middle strut 14 is still outside the housing body 2. Subsequently, the middle strut 14 can be moved substantially perpendicular to the housing opening 9 toward the interior space 3 until the pins 31 find their way into the first elongated hole sections 29a of the elongated holes 29 or, in other words, the elongated holes 29 are fitted with their open ends onto the pins 31. This initial movement of the middle strut 14 is indicated by an arrow A in FIG. 7a, while the state in which the pin is already at least partially received in the first elongated hole section 29a is shown in FIG. 7b.

Further referring to FIG. 7b, the middle strut is displaced in the direction A until the pin 31 reaches and overcomes the bend between the first elongated hole section 29a and the third, center elongated hole section 29c connecting the first elongated hole section 29a to the second elongated hole section 29b. Once this is the case, the middle strut 14 can be moved in a horizontal direction, as indicated by an arrow B in FIG. 7b, substantially perpendicular to the direction A in FIG. 7a and parallel to the housing opening 9, so that the pin 31 increasingly moves or is relatively displaced along the third elongated hole section 29c towards the second elongated hole section 29b. Insofar as a (relative) displacement or movement of the pin 31 is mentioned here, it is understandable that the middle strut 14 as such is moved or displaced, but thereby a corresponding relative displacement between the pin 31 and the elongated hole sections 29a-29c is caused.

Once the pins 31 reach the opposite end of the third elongated hole section 29 and align with the second elongated hole section 29b, the pins 31 can overcome the further bend and find their way into the second elongated hole sections 29b. Then, the pins 31 can be further relatively moved in a direction indicated by an arrow C in FIG. 7c, perpendicular to the direction B in FIG. 7b and perpendicular to the housing opening 9 toward the interior space 3, so as to move or be relatively displaced along the second elongated hole sections 29b toward the closed ends thereof.

When the pins 31 reach the closed ends of the elongated holes 29, the middle strut 14 is in its final position, in which the middle strut 14 is readily detachably mounted to the housing body 2, loosely supported and movably retained. The width and length of the elongated holes 29 in all elongated hole sections 29a-29c are suitably selected in relation to the dimensions of the pins 31 or other engagement means such that each pin 31 or other engagement means can be readily received with clearance in and moved along the associated elongated hole 29, providing the middle strut 14, when assembled, with appropriate freedom of movement relative to the housing body 2. In the end position, the middle strut 14 can be set back slightly towards the interior space 3 relative to the housing flange 12, in particular the housing contact surface 13, as can also be seen in FIG. 6.

It will be understood that the first and second bearing members 21 and 22 on the middle strut 14 and the housing body 2 may also be interchanged with each other, so that, where appropriate, slightly modified tabs with elongated holes may be provided on the housing body 2, while the pins 31 or other engagement means may be provided on the middle strut 14. Furthermore, the pins 31 may be integrally formed on the middle strut 14 or the housing body 2, or may be fixedly secured thereto by any method of connection, such as by bolting, welding or otherwise.

Referring again to FIGS. 1 and 2, it can be seen that the explosion-proof housing 1 further comprises at least two lids 32. The lids 32 are configured to completely cover the housing opening 9 in a closed position of the lids 32. In the illustrated embodiment, the number and size of the lids 32 correspond to the number and size of the opening sections 9a, 9b defined by the middle strut 14 or a plurality of such middle struts. In the illustrated preferred exemplary embodiment with a single middle strut, that is preferably centrally located, there are two lids 32, which may be here of substantially equal size. If two or more middle struts 14 or opening sections of the housing opening 9 are present, the number of lids 32 increases accordingly.

Figure 8:
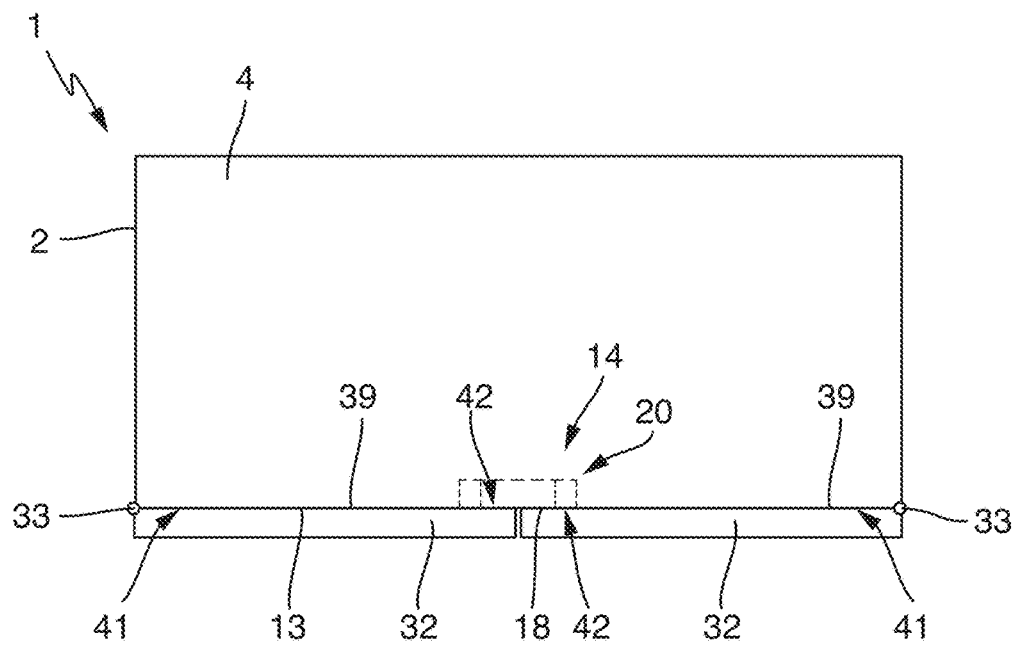
FIG. 8 is a top view of the explosion-proof housing shown in FIG. 1.

The lids 32 are designed as separate components and are not directly connected or movably coupled to each other. Each lid 32 can be moved between a closed position and an open position independently of the one or more other lids 32. In an explosion-proof housing 1 according to FIGS. 1 and 2, the lids 32 are in their respective closed positions in the view shown in FIG. 1, while they are in a respective open position in FIG. 2. The lids 32 may be pivotally mounted as swing-open hinged doors on the housing body 2 or on the housing flange 12, if present, via hinges or joints 33 shown in FIG. 8, and may be pivoted between the closed position and the open position. It is also possible to realize the lids 32 as completely separately handleable components which are not hinged to the housing body 2.

As can be seen in particular in FIGS. 1 and 2, a tensioning mechanism 34 is provided for releasably connecting the lids 32, the middle strut 14 and the housing body 2 to one another. In particular, the tensioning mechanism 34 is provided and arranged here to tighten and retain the lids 32 in contact with the housing body 2 and the middle strut 14 so that defined flameproof gaps are formed and maintained between the lids 32 and the housing body 2 and the middle strut 14.

In the embodiment shown, the tensioning mechanism 34 is based on a screw connection and includes screw bolts 36 and threaded holes 37 cooperating therewith, which are incorporated in the housing contact surface 13 of the housing body 2, in particular of the housing flange 12 and distributed along the middle strut 14. In addition, openings 38 are provided in the lids 32 which, in the closed state of the lids 32, are aligned with the threaded holes 37 of the housing body 2 and the middle strut 14 and can be optionally configured with or without threads.

Figure 10:
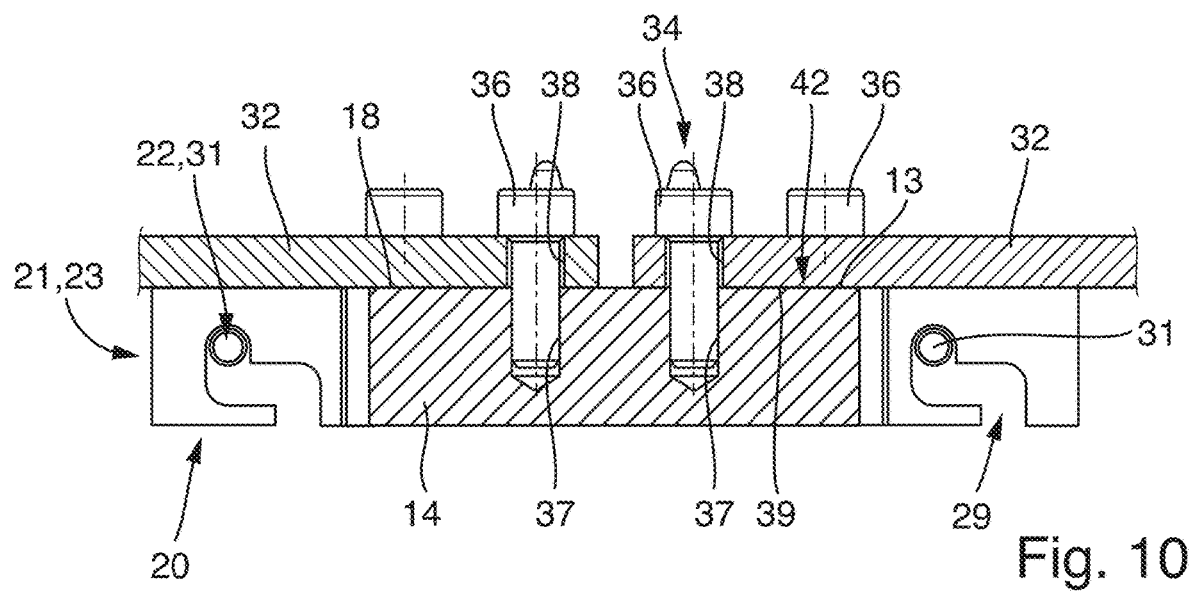
FIG. 10 is a cross-sectional view of a section of the interface between lids and the middle strut of the explosion-proof housing of FIG. 1 in the closed state, showing the flameproof gaps formed between them and the bearing device for the middle strut.

As can also be seen in FIG. 10, the screw bolts 36 are screwed through the openings 38 in the lids 32 into the threaded holes 37 in the housing body 2 and middle strut 14 and tightened to firmly secure the lids 32 for use.

In the illustrated embodiment, the solid middle strut 14 has a thickness, measured perpendicularly between the middle strut contact surface 18 and the back surface 19, sufficient to form an internal thread directly in the middle strut 14. The internal thread is thus an integral part of the middle strut 14.

Alternatively, the middle strut 14 could also be designed with a reduced thickness, for example as a U-shaped profile, in which case, for example, internally threaded bushings, not shown in more detail here, can be attached to the rear side 19 of the middle strut 14 facing the interior space 3. The connection of the threaded bushings to the middle strut 14 can be made by welding, bonding or another suitable method of connection. By using a middle strut 14 with reduced thickness and threaded bushings, the weight of the middle strut 14 can be reduced as needed.

In the following, the assembly and setup of the explosion-proof housing 1 will now be explained in more detail.

First, the housing body 2 is provided, assuming that the middle strut 14 is not yet mounted to the housing body 2. Otherwise, the middle strut 14 can be quickly and easily detached from the housing body 2 as needed, for example, if the explosion-proof housing 1 is to be retrofitted after use and the entire housing opening 9 is needed to accommodate even large and bulky electrical and/or electronic devices 11 in the interior space 3. The detachment and removal of the middle strut 14 from the housing body 2 is performed in the reverse order and manner as illustrated in FIGS. 7a-7c and described in connection therewith above. Thus, the middle strut 14 may be moved by successive movements perpendicular and transverse to the access opening 9 to move the elongated holes 29 relative to the bolts 31 on the housing body 2 such that the bolts 31 are relatively displaced along the elongated holes 29 until they exit the tabs 23 through the open ends of the elongated holes 29. Once the middle strut 14 is released in this manner, it can be removed, at which time barrier-free access to the interior space 3 is provided through the entire housing opening 9.

When all electrical, electronic or other devices 11 have been positioned or mounted in the interior space 3, the middle strut 14 can then be detachably mounted to the housing body 2 in the manner described above in connection with FIGS. 7a-7c. In the mounted state, the middle strut 14 is loosely supported on the housing body 2 by means of the bearing devise 20. Subsequently, the lids 32 can be closed and firmly connected to the housing body 2 and the middle strut 14 by means of the tensioning mechanism 34. For this purpose, the screw bolts 36 are inserted through the openings 38 in the lids 32 and screwed into the threaded holes 37 in the housing body 2 and the middle strut 14 and tightened.

When the screw bolts 36 are tightened in the internal threads of the threaded holes 37 of the middle strut 14, the middle strut 14 can move toward the lids 32 due to its loose support on the housing body 2 that allows movement until the middle strut contact surface 18 fits snugly against the corresponding contact surfaces 39 of the lids 32. This is made possible by the loose, movable mounting between the bolts 31 and the elongated holes 29, in particular in the second elongated hole section 29b.

Figure 9:
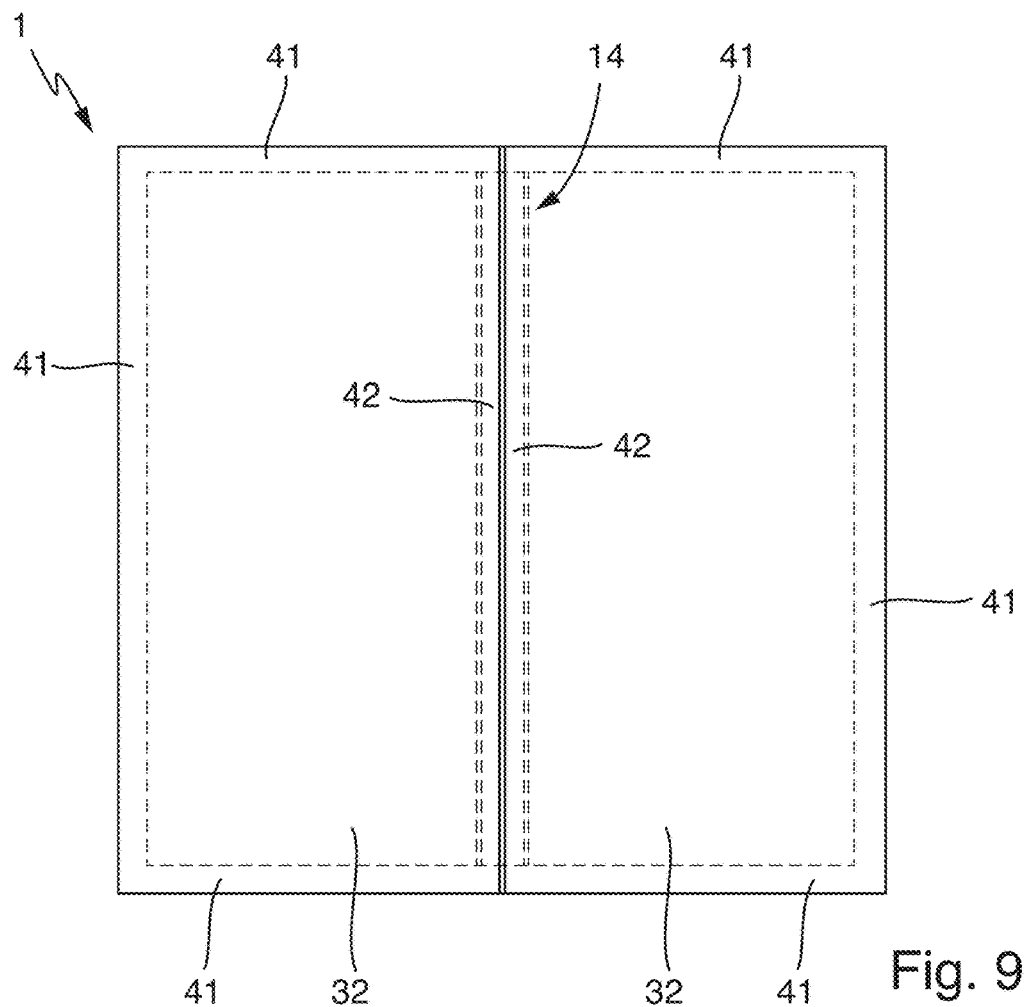
FIG. 9 is a front view of the housing of FIG. 1, with special illustration of the flameproof gaps.

In the firmly mounted state, the lid contact surface 39 of each lid 32 rests against the respective half circumferential housing contact surface 13 and the middle strut contact surface 18 and is pressed against them by the tensioning mechanism 34. A first flameproof gap 41 is formed between the lid contact surface 39 of each lid 32 and the housing contact surface 13, as it is shown in the top view of the housing 1 according to FIG. 8, in the front view according to FIG. 9 or in the detailed cross-sectional view according to FIG. 10. The first flameproof gap 41 is a flat gap located in the gap plane defined between the lid contact surface or gap surface 39 and the housing contact surface or gap surface 13.

In addition, the tensioning mechanism 34 also secures the lids 32 to the middle strut 14 so that they each have a corresponding peripheral section (inner end section) of their lid contact surface 39 resting against a corresponding section of the middle strut contact surface 18 of the middle strut 14. The inner ends of the lids 32, which face each other, are spaced a small distance apart without contacting each other in closed state. The end sections of the lid contact surfaces or lid gap surfaces 39 each form, with the associated sections of the middle strut contact surface or middle strut gap surface 18, a second flameproof gap 42. The gap 42 is also formed as a flat gap and lies in the same plane as the first flameproof gap 41. Thus, a substantially circumferential, continuous flameproof gap is formed on each lid 32 that includes the first flameproof gap 41 and the second flameproof gap 42.

All flameproof gaps 41, 42 are flat gaps which are located in the same gap plane and are sufficiently narrow and long so that no flame, spark or hot ignitable gases can escape from the interior to the outside through the flameproof gaps. The tensioning mechanism 34 holds the lids 32 in firm contact with the housing body 2 so that even in the event of an impulse-like increase in pressure in the housing 1, the gap width does not reach a gap dimension which would permit an ignition transmission.

Optionally, additional seals in accordance with an IP protection class could be provided against the ingress of dust and/or water into the interior space 32. The flameproof gaps 41, 42 are dimensioned—independently of an optional seal— with regard to the flow path between the interior space 3 and the environment 7 in such a way that hot gases are sufficiently cooled or sparks or flames are extinguished before they reach the environment 7 with the potentially explosive atmosphere on their way from the interior space 3 to the outside. In this way, the flame proofing is achieved. The design of the flameproof gaps 41, 42 corresponds to one or more predetermined standards. Preferably, the explosion-proof housing 1 is formed in the ignition protection type "flameproof enclosure" (Ex d) in accordance with one of the standards EN 60079-1 or IIC 60079-1.

Various modifications of the explosion-proof housing described above are possible. As already noted above, the housing 1 may have different shapes and different number and arrangements of middle struts 14 and associated lids 32. For example, more than two middle struts 14 may be provided, which may be positioned spaced apart side by side, parallel to each other, or in other orientations relative to each other. Horizontal struts may also be provided, which also allow lids 32 to be arranged one above the other. Such struts may also be detachably mounted to the housing body 2 with the described loose support and freedom of movement. It should be emphasized that the terms "loose support" and "movable retainment" refer primarily to the mounted state of the middle strut 14 on the housing body 2, when the lids 32 are not yet secured to the housing body 2 and the middle strut 14 by the tensioning mechanism 34. In any case, however, no tensioning means, clamp means or other fixing means are provided which would firmly fix the middle strut 14 directly or immediately to the housing body 2.

Various tensioning mechanisms may be provided. Instead of the screw connections, tensioning clamps, quick-release fasteners or other locking mechanisms or tensioning means, fastening means, clamping or holding means can hold the lid 32 in firm contact with the housing body 2 and the middle strut 14.

Further advantageous embodiments of the invention are shown in FIGS. 11-16. Insofar as the embodiments correspond to the embodiment described above with respect to the structure and/or the mode of operation, reference is made to the above description on the basis of the same reference signs.

Figure 11A:
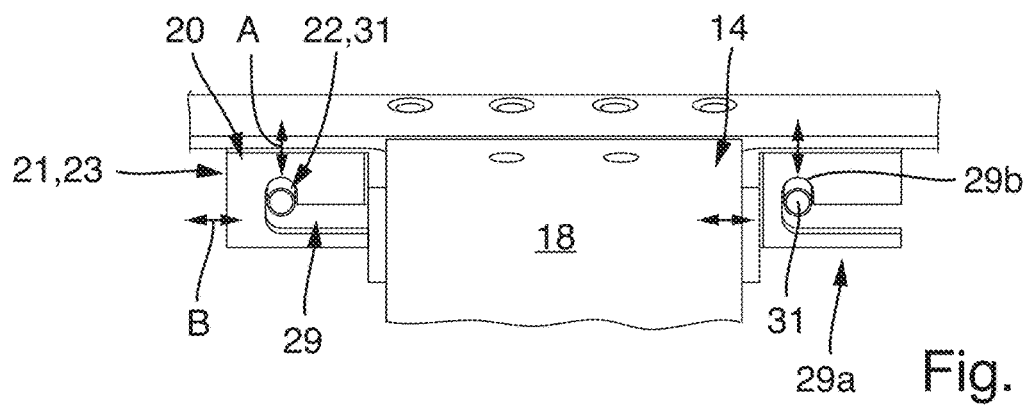
FIGS. 11a and 11b illustrate further embodiments of a bearing device for loosely supporting the middle strut on the housing body of the explosion-proof housing, in highly simplified perspective view.
Figure 11B:
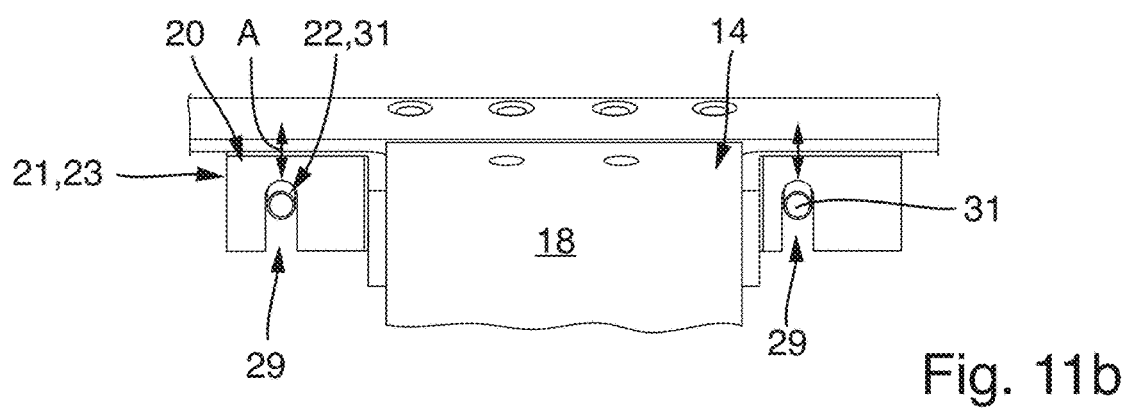

FIGS. 11a and 11b illustrate, in an embodiment similar to FIG. 7c, modified embodiments of the elongated holes 29 of the L-shaped tabs 23 for loosely supporting and movably retaining the middle strut 14. In FIG. 11b, each elongated hole 29 has only a first elongated hole section 29a and a second elongated hole section 29b, but no intervening third elongated hole section 29c. The first elongated hole section 29a extends substantially in the lateral direction, perpendicular to the lateral surface 27 of the middle strut 14, so that its open end opens outwardly to the side from the tab 23. The first elongated hole section 29a passes directly into the second elongated hole section 29b, forming a 90° bend, in which the pin 31 is received in the end position shown. For assembly, the middle strut 14 is positioned between the upper and lower sections of the housing body 2 and the housing flange 12, respectively, and is moved laterally, parallel to the housing opening in such a way that the bolts 32 find their way into the first elongated hole sections 29a and are moved relative to the respective elongated hole 29 up to the second elongated hole section 29b.

FIG. 11b illustrates another optional embodiment of the elongated hole 29. Here, the elongated hole 29 has only a single elongated hole section with an open end facing away from the middle strut contact surface 18 and a closed end facing the middle strut contact surface 18. Only a single movement of the middle strut 14 in a direction A perpendicular to the housing opening 9 is required to mount or dismount the middle strut 14 on or from the housing body 2, to fit the elongated holes 29 on or off the associated bolts 31 and to move the elongated holes 29 and the bolts 31 relative to each other.

Another advantageous embodiment of an explosion-proof housing 1 according to the invention is shown in FIGS. 12 to 16. This embodiment of the housing 1 uses, in addition to the housing body 2 and the detachably mounted and loosely supported middle strut 14, an intermediate frame 43 which, in operation, is inserted between the lids 32 and the housing body 2 and the middle strut 14. The intermediate frame 43 is made of a thin, slightly elastic sheet metal and may be made of the same material, in particular metallic material, as the housing body 2 and the middle strut 14. The thickness of the intermediate frame 43 may be less than 10 mm, preferably less than 5 mm, in order to cooperate well with the middle strut 14.

The intermediate frame 43 comprises a circumferential web 44 and at least one middle web 46. The circumferential web 44 is arranged to surround the housing opening 9 in the mounted state and to rest against the housing contact surface or gap surface 13 of the housing body 2, forming a flameproof gap. For this purpose, a first surface section 47a of an inner frame contact surface or inner frame gap surface 47 is formed on the circumferential web 44, preferably extending in a single plane. The frame contact surface 47 is adapted to be placed against the housing contact surface 13. A frame inner region 48 of the intermediate frame 43 enclosed by the circumferential web 44 preferably has the same shape and the same dimension as the housing opening 9 of the housing body 2.

The middle web 46 of the intermediate frame 43 passes through the frame inner region 48 and divides it into two region sections matching the opening sections 9a, 9b of the housing opening 9 divided by the middle strut 14. In the embodiment of the intermediate frame 43 shown in isolation in the exploded view according to FIG. 12 and in the perspective view according to FIG. 13, there is a single middle web 46 dividing the frame inner region 48 into a first region section 48a and a second region section 48b. There may also be multiple middle webs 46, matching the number of middle struts 14.

The at least one middle web 46 is preferably connected at each of its two ends to the circumferential web 44. It may be integrally formed with the circumferential web 44 or fixedly connected thereto by bonding, welding or other suitable means. The middle web 46 preferably extends in a straight line. On its rear side, which faces and covers the middle strut 14 in the mounted state, the middle web 46 has a further section 47b of the inner frame contact surface 47.

On the outer side facing away from the housing body 2 and the middle strut 14 in the mounted state, the intermediate frame 43 has an outer frame contact surface or outer frame gap surface 49. The outer frame contact surface 49 includes a first contact surface section 49a on the circumferential web 44 and a second contact surface section 49b on the middle web 46.

In addition, through-holes 51 are formed in the intermediate frame 43 to align with threaded holes 37 in the housing body 2 and the middle strut 14 and the openings 38 of the lids 32 when the lids 32 are in the closed state and the intermediate frame 43 is inserted between the lids 32 and the housing body 2.

Figure 14:
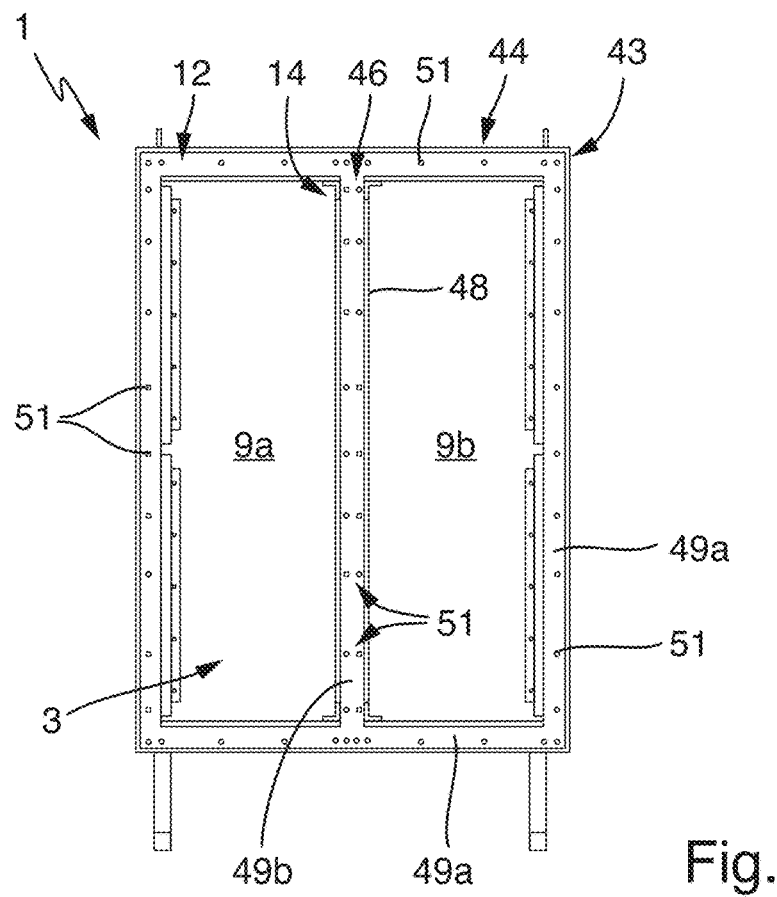
FIG. 14 is a front view of the housing of FIG. 12 in the open state with a view of the intermediate frame, omitting the lids of the housing.

FIG. 14 shows a front view of the housing body 2 with the intermediate frame 43 attached thereto in an open state, with the lids 32 omitted. The circumferential web 44 of the intermediate frame 43 adjoins and at least partially covers the frame region of the housing body 2 surrounding the housing opening 9 or the housing flange 12, if present, while the middle web 46 adjoins and at least largely covers the middle strut 14.

By means of the tensioning mechanism 34, which has a plurality of tensioning means, in particular screw bolts with associated threaded holes 37, the lids 32, the intermediate frame 43, the housing body 2 and the middle strut 14 are releasably connected to one another. The tensioning mechanism 34 is adapted to tighten and hold the intermediate frame 43 in contact with the housing body 2 and the middle strut 14, and to tighten and hold the lids 32 in contact with the circumferential web 44 and the middle web 46 of the intermediate frame 43. In this regard, countersunk screws (not illustrated) may be used to pre-assemble the intermediate frame 43 to the housing body 2 while screwing and tightening the screw bolts 36 or other tensioning means through the openings 38 of the lids 32 and the through-holes 51 of the intermediate frame 43 and into the threaded holes 37 in the threaded body 2 and the middle strut 14 to finally secure both the intermediate frame 43 and the lids 32.

In the mounted state, the first inner frame contact surface section 47a rests against the half circumferential housing contact surface 13 and is pressed thereagainst by the tensioning mechanism 34 to form the first flameproof gap 41 therebetween. Further, the second inner frame contact surface section 47b is pressed into contact against the middle strut contact surface 18 at the middle web 46 to form the second flameproof gap 42 therebetween. The flameproof gaps 41, 42 are flat gaps lying in a common plane defined between the intermediate frame 43 and the housing body 2 and the middle strut 14.

Figure 12:
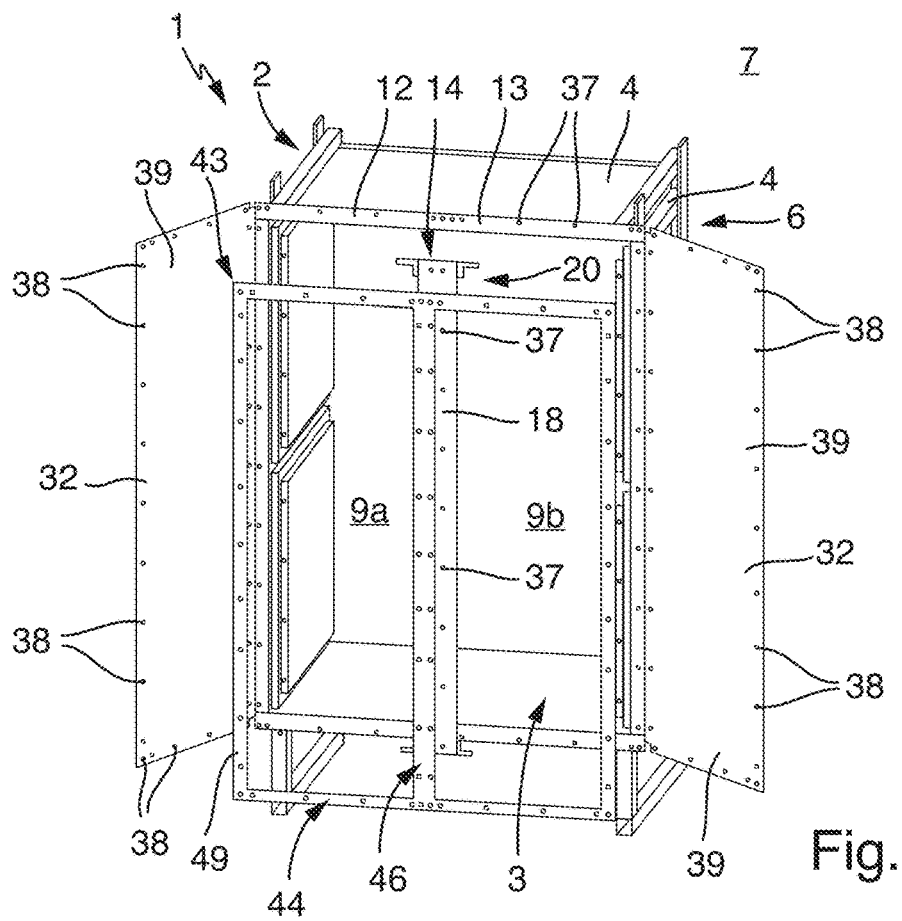
FIG. 12 is an exploded view of another embodiment of an explosion-proof housing that uses an intermediate frame.
Figure 13:
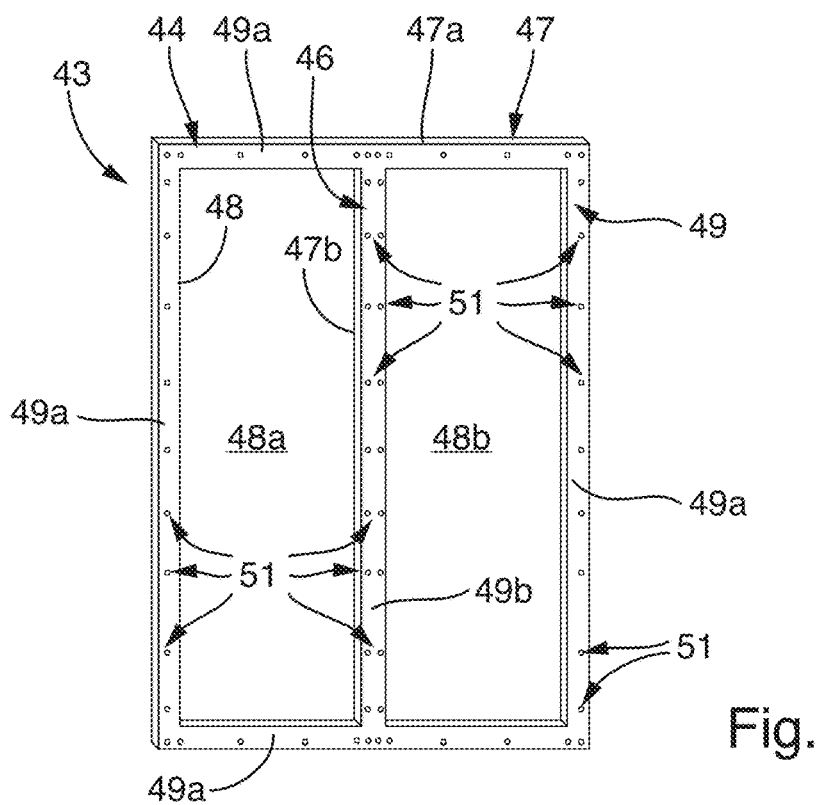
FIG. 13 is a perspective view of the intermediate frame of the housing of FIG. 12, in simplified representation.
Figure 15:
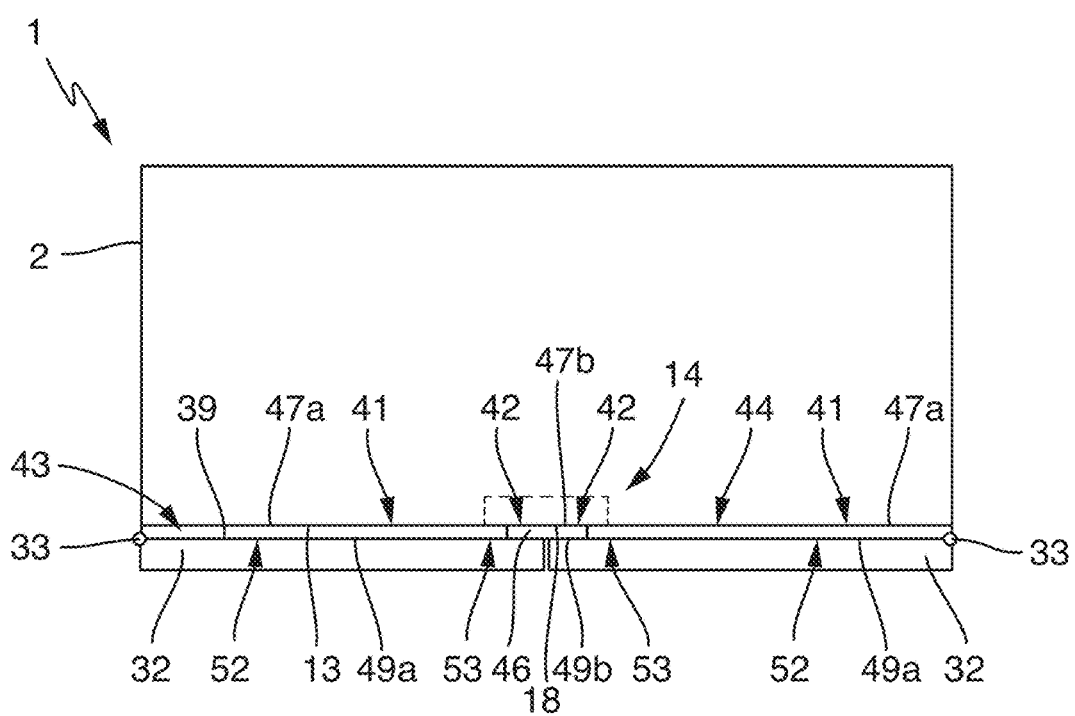
FIG. 15 is a top view of the explosion-proof housing of FIG. 12.

Furthermore, when the lids 32 rest against and are secured to the intermediate frame, a third flameproof gap 52 is respectively formed between the section 49a of the outer frame contact surface at the circumferential web 44 of the intermediate frame 43 and the opposite half circumferential lid contact surface 39, while a fourth flameproof gap 53 is respectively formed between the surface section 49b of the outer frame contact surface 49 at the middle web 46 of the intermediate frame 43 and the inner edge section of the lid contact surface 39 of the lid 32. The first through fourth flameproof gaps 41, 42, 52, 53 are shown in FIG. 15, which is a top view of the explosion-proof housing 1 as shown in FIG. 12 in a simplified view omitting some details.

Figure 16:
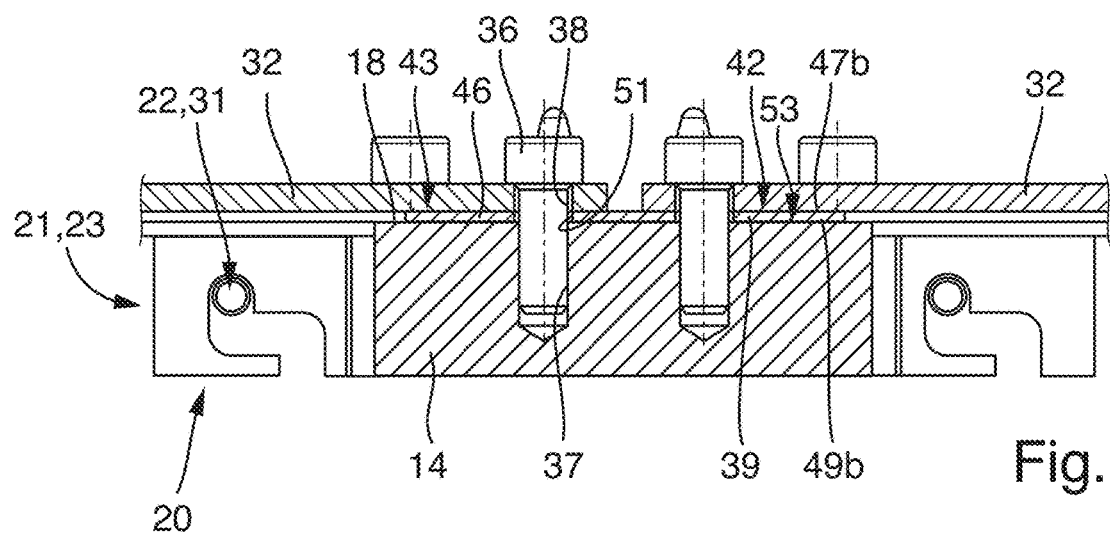
FIG. 16 is a cross-sectional view of a section of the interface comprising the lids, the intermediate frame and the middle strut of the housing of FIG. 12, in simplified view similar to FIG. 10, illustrating the flameproof gaps and the bearing arrangement for the middle strut.

FIG. 16 shows a cross-section through a section of the housing 1 in which the lids 32, the middle web 46 of the intermediate frame 43 and the middle strut 14 are shown in the mounted state. In particular, FIG. 16 shows the second flameproof flat gap 42 and the fourth flameproof gap 53 formed between the middle web 46 of the intermediate frame 43 and the middle strut 14, on the one hand, and the inner edge sections of the lids 32, on the other hand. FIG. 16 also illustrates the bearing device 20 which loosely supports and movably retains the middle strut 14 to the housing body 2, and exemplary screw bolts 36 which releasably connect the lids 32 and the intermediate frame 43 to the middle strut 14 and provide for the maintenance of the flameproof gaps. When the screw bolts 36 are tightened, the middle strut 14 can be gently and uniformly pulled, moved, placed and pressed against the middle web 46 of the thin intermediate frame 43 so that no deformation of the intermediate frame 43 results and an optimum, minimum flameproof gap 53 of uniform gap width is obtained along the entire middle strut gap surface 18 without requiring any adjustment for this purpose.

An explosion-proof housing 1 according to the invention comprises a housing body 2 which delimits an interior space 3 and includes a housing opening 9 which provides access to the interior space 3, at least one middle strut 14 which extends between sections of the housing body 2 and divides the housing opening 9 into at least two opening sections 9a, 9b, and at least two separate lids 32 configured and arranged to be respectively secured in the closed state to the housing body 2 and the middle strut 14 such that only flameproof gaps 41, 42, 52, 53 are formed between the lids 32 and the housing body 2 and between the lids 32 and the middle strut 14. The middle strut 14 is detachably mounted on the housing body 2 and, in the mounted state, is loosely supported and movably retained on the housing body 2 so that it is not directly fixed to the housing body 2 by any fixing means. As such, the middle strut 14 can be individually removed from the housing body 2 relatively easily and quickly to create a barrier-free housing opening 9 of maximum size.

The invention claimed is:

1. An explosion-proof housing, comprising:
  a housing body defining an interior space and having a housing opening providing access to the interior space, the housing body having a circumferential housing gap surface surrounding the housing opening;
  at least one middle strut which can be detachably mounted on the housing body so that the at least one middle strut can be removed from the housing body, while in a mounted state to the housing body, the at least one middle strut extends between sections of the circumferential housing gap surface and divides the housing opening into at least two opening sections, the at least one middle strut having at least one middle strut gap surface; and
  at least two separate lids which are configured and arranged to be secured in each case in a closed state to the housing body and the at least one middle strut in such a way that flameproof gaps are formed between the at least two separate lids and the housing body at the circumferential housing gap surface and between the at least two separate lids and the at least one middle strut at the at least one middle strut gap surface,
  wherein the at least one middle strut is loosely supported on the housing body until each of the at least two separate lids is secured in the closed state.

2. The explosion-proof housing according to claim 1, wherein the circumferential housing gap surface defines a first of the flameproof gaps and the at least one middle strut gap surface defines a second of the flameproof gaps, and
  wherein the first and the second flameproof gaps of the flameproof gaps are flat gaps lying in a common plane.

3. The explosion-proof housing according to claim 2, further comprising an intermediate frame made of a thickness of less than 10 mm, elastic sheet metal, which is detachably fastened to the housing body and which comprises a circumferential web surrounding the housing opening and resting against the circumferential housing gap surface forming the first of the flameproof gaps, and at least one middle web which extends inside the circumferential web and covers the at least one middle strut and rests against the at least one middle strut gap surface, forming the second of the flameproof gaps, wherein a further flameproof gap of the flameproof gaps is formed between each lid of the at least two separate lids and the intermediate frame.

4. The explosion-proof housing according to claim 3, wherein a tensioning mechanism is provided and arranged to:
  tighten and hold the intermediate frame in contact with the housing body and the at least one middle strut and maintain the first of the flameproof gaps between the housing body and the intermediate frame and the second of the flameproof gaps between the at least one middle strut and the intermediate frame, and
  tighten and hold the at least two separate lids in contact with the circumferential web and the at least one middle web of the intermediate frame, and maintain the further flameproof gap of the flameproof gaps between each lid of the at least two separate lids and the intermediate frame, and
  wherein the tensioning mechanism comprises a tensioning means serving to firmly fix both the intermediate frame and a respective lid of the at least two separate lids.

5. The explosion-proof housing according to claim 3, wherein the thickness of less than 10 mm of the intermediate frame is less than 5 mm.

6. The explosion-proof housing according to claim 2, wherein prior to each of the at least two separate lids being secured in the closed state, the at least one middle strut is arranged to be loosely supported and movably retained on the housing body, and no fixing means is provided for directly securing the at least one middle strut to the housing body.

7. The explosion-proof housing according to claim 6, comprising a bearing device for loosely supporting and movably retaining the at least one middle strut on the housing body prior to each of the at least two separate lids being secured in the closed state, the bearing device comprising a first bearing member on the at least one middle strut and a second bearing member cooperating therewith on the housing body.

8. The explosion-proof housing according to claim 7, wherein one of the first and the second bearing members comprises a tab provided on one of the at least one middle strut and the housing body and formed with an elongated hole, and another of the first and the second bearing members comprises a bolt slidably received in the elongated hole upon assembly of the at least one middle strut to the housing body.

9. The explosion-proof housing according to claim 8, wherein the tab provided on the one of the at least one middle strut and the housing body is the tab provided on the at least one middle strut, the elongated hole is a plurality of elongated holes and the bolt is a plurality of bolts, wherein the at least one middle strut comprises two substantially L-shaped tabs including the tab at each longitudinal end of the at least one middle strut, one leg of each of the two substantially L-shaped tabs is attached to a respective side surface of the at least one middle strut and another leg of each of the two substantially L-shaped tabs comprises an associated one of the elongated holes, and wherein the bolts are formed on the housing body, each one of the bolts cooperates with as the associated one of the elongated holes in order to loosely support and movably retain the at least one middle strut.

10. The explosion-proof housing according to claim 9, wherein each of the elongated holes comprises a single elongated hole section having an open end and extending in a direction perpendicular to the at least one middle strut gap surface, and which is configured to be sufficiently wide and long to allow for relative displacement between each of the bolts and the associated one of the elongated holes.

11. The explosion-proof housing according to claim 1, wherein prior to each of the at least two separate lids being secured in the closed state, the at least one middle strut is arranged to be loosely supported and movably retained on the housing body, and no fixing means is provided for directly securing the at least one middle strut to the housing body.

12. The explosion-proof housing according to claim 1, comprising a bearing device for loosely supporting and movably retaining the at least one middle strut on the housing body prior to each of the at least two separate lids being secured in the closed state, the bearing device comprising a first bearing member on the at least one middle strut and a second bearing member cooperating therewith on the housing body.

13. The explosion-proof housing according to claim 12, wherein one of the first and the second bearing members comprises a tab provided on one of the at least one middle strut and the housing body and formed with an elongated hole, and the another of the first and the second bearing members comprises a bolt slidably received in the elongated hole upon assembly of the at least one middle strut to the housing body.

14. The explosion-proof housing according to claim 13, wherein the tab provided on the one of the at least one middle strut and the housing body is the tab provided on the at least one middle strut, the elongated hole is a plurality of elongated holes, and the bolt is a plurality of bolts, wherein the at least one middle strut comprises two substantially L-shaped tabs including the tab at each longitudinal end of the at least one middle strut, one leg of each of the two substantially L-shaped tabs is attached to a respective side surface of the at least one middle strut and another leg of each of the two substantially L-shaped tabs comprises an associated one of the elongated holes, and wherein the bolts are formed on the housing body, each one of the bolts cooperates with the associated one of the elongated holes in order to loosely support and movably retain the at least one middle strut.

15. The explosion-proof housing according to claim 14, wherein each of the elongated holes comprises a single elongated hole section having an open end and extending in a direction perpendicular to the at lease least one middle strut gap surface, and which is configured to be sufficiently wide and long to allow for relative displacement between each of the bolts and the associated one of the elongated holes.

16. The explosion-proof housing according to claim 14, wherein each of the elongated holes comprises two or more elongated hole sections joined together to form a bend and the two or more elongated hole sections are designed with sufficient width and length to allow for relative displacement between each of the bolts and the associated one of the elongated holes.

17. The explosion-proof housing according to claim 16, wherein each of the elongated holes comprises a first elongated hole section of the two or more elongated hole sections aligned perpendicular to the middle strut gap surface and having an open end, a second elongated hole section of the two or more elongated hole sections arranged parallel to and offset from the first elongated hole section, and a third elongated hole section of the two or more elongated hole sections connecting the first elongated hole section to the second elongated hole section.

18. The explosion-proof housing according to claim 1, wherein a tensioning mechanism is provided and arranged to tighten and hold the at least two separate lids to the housing body and the at least one middle strut and to maintain the flameproof gaps.

19. The explosion-proof housing according to claim 18, wherein the at least one middle strut is loosely supported prior to each of the at least two separate lids being secured in the closed state on the housing body in such a way that at least one middle strut is pulled towards the at least two separate lids by tensioning the at least two separate lids to the at least one middle strut by means of the tensioning mechanism in order to bring the at least one middle strut gap surface into contact with a mating contact surface on the at least two separate lids into a same plane with the circumferential housing gap surface.

20. The explosion-proof housing according to claim 18, further comprising an intermediate frame interposed between the at least one middle strut and the at least two separate lids, and wherein the at least one middle strut is loosely supported on the housing body prior to each of the at least two separate lids being secured in the closed state in such a way that the at least one middle strut is pulled towards the at least two separate lids by tensioning the at least two separate lids to the at least one middle strut by means of the tensioning mechanism in order to bring the at least one middle strut gap surface into contact with a first mating contact surface on the intermediate frame into a same plane with the circumferential housing gap surface, and an opposite second mating contact surface on the intermediate frame into a same plane with each of the at least two separate lids.

* * * * *